June 28, 1966  J. V. COWAN  3,257,843
ULTRASONIC INSPECTION APPARATUS
Original Filed Dec. 12, 1960  3 Sheets-Sheet 1

INVENTOR
JOHN V. COWAN
BY
Robert Hockfield
ATTORNEY.

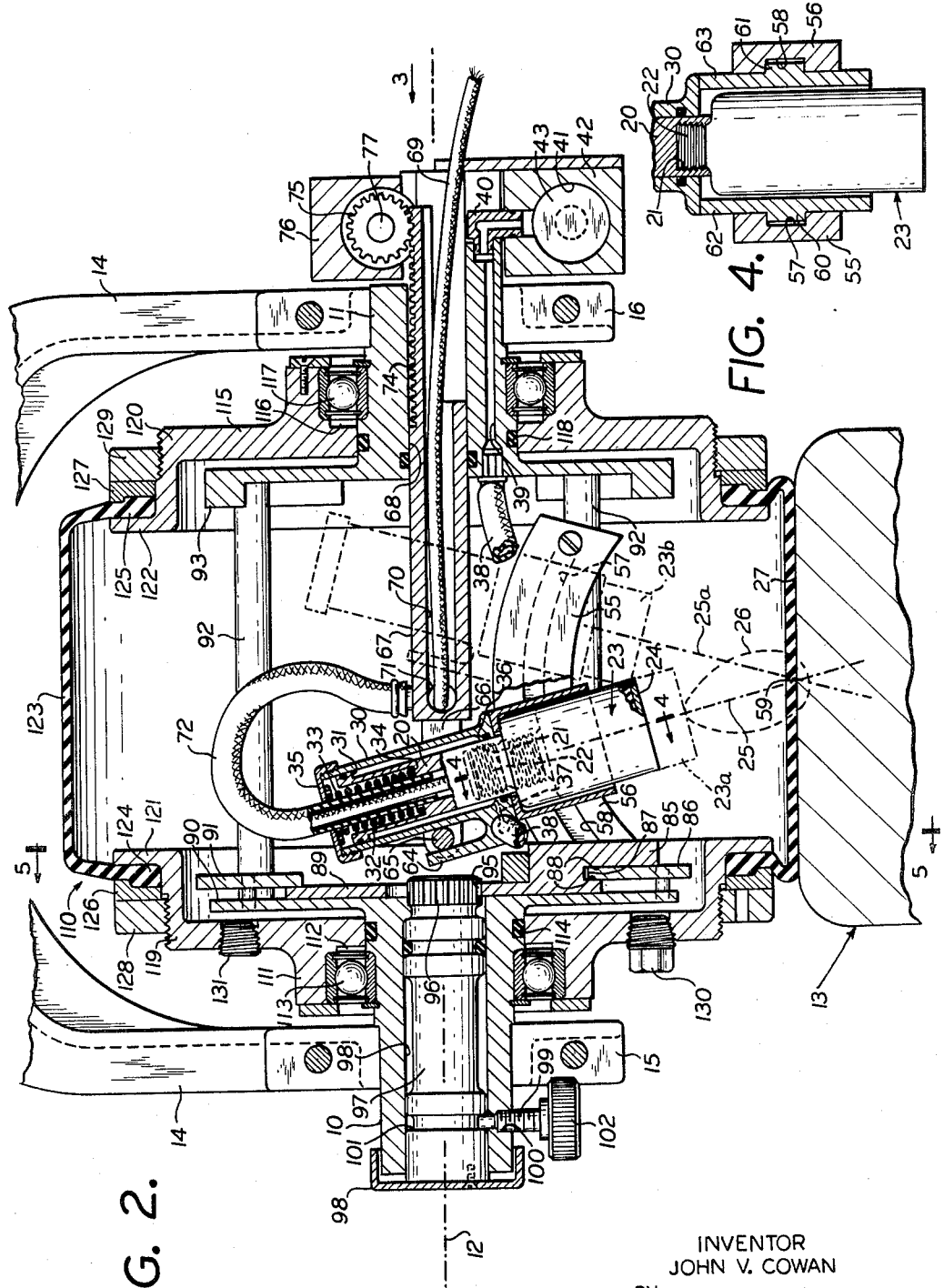

June 28, 1966   J. V. COWAN   3,257,843
ULTRASONIC INSPECTION APPARATUS
Original Filed Dec. 12, 1960   3 Sheets-Sheet 3

INVENTOR
JOHN V. COWAN
BY
Robert Hoexfield
ATTORNEY.

United States Patent Office 3,257,843
Patented June 28, 1966

3,257,843
ULTRASONIC INSPECTION APPARATUS
John V. Cowan, Danbury, Conn., assignor to Automation Industries, Inc., El Segundo, Calif., a corporation of California
Continuation of application Ser. No. 75,155, Dec. 12, 1960. This application Apr. 29, 1965, Ser. No. 453,562
12 Claims. (Cl. 73—71.5)

This invention relates to ultrasonic testers and, more particularly, to a new and improved search unit for such testers.

This application is a continuation of co-pending application Serial No. 75,155 entitled Ultrasonic Inspection Apparatus, filed Dec. 12, 1960.

In ultrasonic inspection, ultrasonic wave energy from a transducer is propagated through a suitable couplant into an object under test. Any discontinuities in a test member, for example such as produced by flaws, cause reflections of ultrasonic energy traveling through the test member. The reflected ultrasonic energy is returned to the transducer. Of course, appropriate electrical apparatus is associated with the transducer for producing the emitted wave energy and for utilizing signals derived in response to reflected wave energy to provide indications of flaws or defects. It is often desirable to vary the angle at which ultrasonic wave energy enters the test object and for this purpose the transducer may be supported for pivotal movement, for example, as shown in Patent No. 2,592,134. In this way, a cross-sectional area of the test object may be scanned for flaws or the response to a particular flaw may be adjusted for maximum signal so as to provide clear indications.

While satisfactory in many applications, scanning with a pivoted transducer may not always be reliable. This is understandable because the transducer is usually spaced from the entrant surface of the test object, being coupled thereto by an intervening body of couplant liquid, and as the transducer is tilted the zone at the surface where wave energy enters is shifted. Thus, it may not always be possible to determine precisely the location of a flaw by scanning.

It is, therefore, an object of the present invention to provide a new and improved search unit assembly for ultrasonic inspection apparatus featuring accurate and reliable annular scanning for a test object.

Another object of the present invention is to provide a new and improved search unit assembly for ultrasonic inspection apparatus for maintaining the zone of entrance of ultrasonic wave energy fixed at the surface of a test object while the transducer is displaced in any of a variety of directions.

A search unit assembly for ultrasonic inspection apparatus in accordance with the present invention comprises a support and a member adapted to carry an electro-mechanical transducer with its beam pattern extending away from the member along an axis. The assembly further comprises means for connecting the member to the support for movement along an arcuate path defining a circle having a center intersected by the axis. Stated more specifically, the beam pattern extends along the axis toward the entrant surface of the test object and the center of the circle is substantially coincident with the intersection of the axis and the entrant surface.

The novel features of the present invention are set forth with particularity in the appended claims. The present invention both as to its organization and manner of operation, together with further objects and advantages thereof, may best be understood by reference to the following description taken in connection with the accompanying drawings in which:

FIG. 2 is a view in longitudinal cross-section of the search unit assembly illustrated in FIG. 1;

Figure 6:
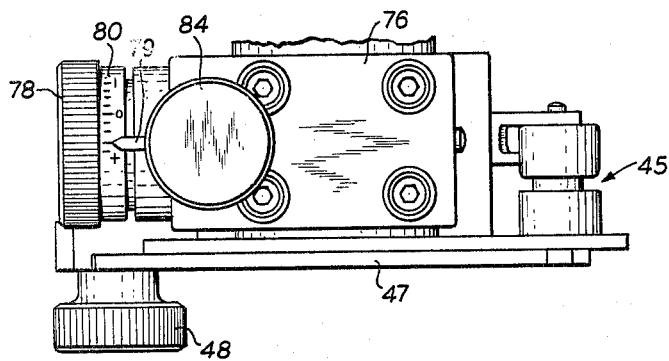
Figure 3:
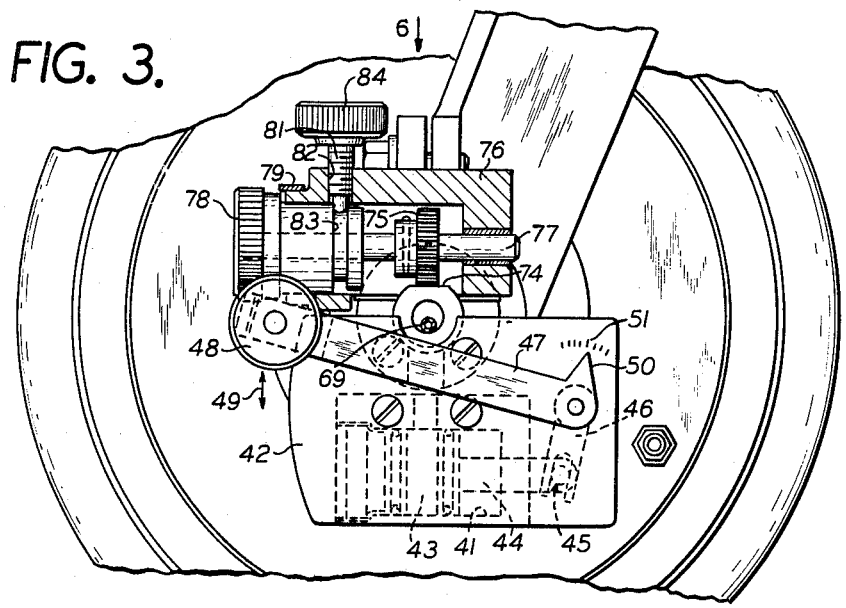
FIG. 3 is a side elevation of the assembly represented in FIG. 2 as viewed in the direction of arrow 3.
Figure 5:
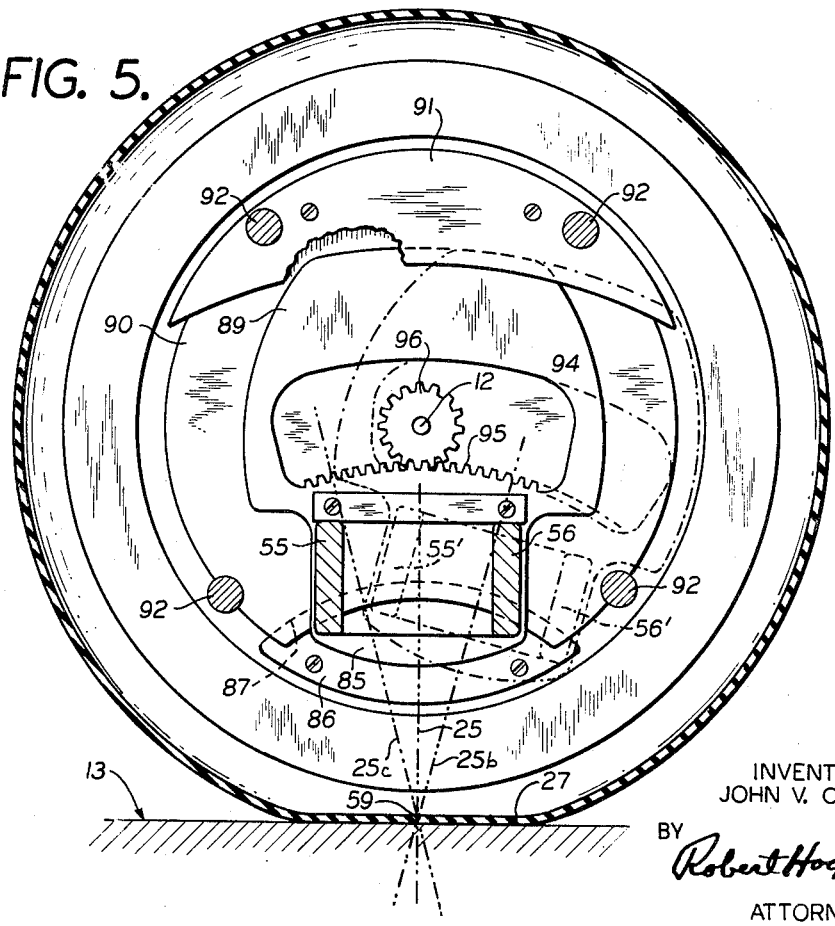

FIGS. 4 and 5 are cross-sectional views taken along lines 4—4 and 5—5 respectively, of the assembly shown in FIG. 2; and FIG. 6 is a representation of a portion of the apparatus as seen when viewed in the direction of arrow 6 in FIG. 3.

Figure 1:
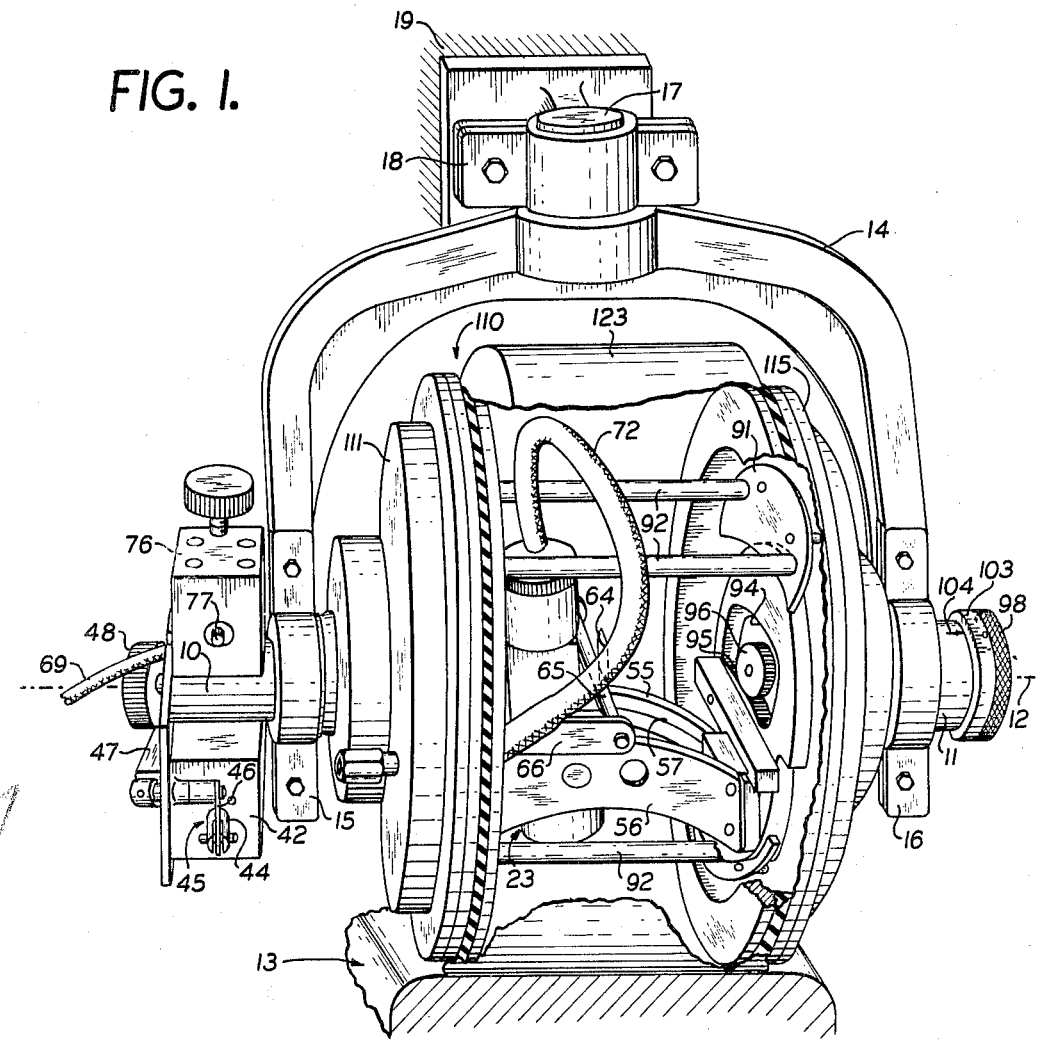
FIG. 1 is a perspective view of a search unit assembly embodying the present invention, a portion of the assembly being cut away to reveal interior details.

As seen in FIG. 1 of the drawings, a search unit assembly constructed in accordance with the present invention includes a support comprised of a pair of opposed shafts 10 and 11. The shafts 10 and 11 (referred to hereinafter as support 10, 11) lie on a horizontal axis 12. This axis 12 is normally maintained fixed in orientation with respect to a test object 13 when the search unit assembly is being used to inspect the test object. During such usage the search unit assembly and the test object are displaced in a horizontal direction relative to each other. The direction of displacement of the test object 13 is at right angles to the axis 12, and the distance between the axis and test object 13 is maintained constant.

To mount the support 10, 11, a U-shaped frame or fork 14 has a pair of clamps 15 and 16 at its open ends secured to the shaft portions of support 10 and 11. From the center of the closed portion of the fork 14, a stub shaft 17 extends vertically and is secured by a clamp 18 to a base 19.

As best seen in FIG. 2, the support 10, 11 is mechanically coupled at its center to a member 20 which it carries. The member 20 is provided with a threaded opening 21 in its lower end for receiving a threaded fitting 22 of a search unit 23. These may be of conventional construction. The search unit 23 includes a transducer 24 which may, for example, be a quartz crystal provided with appropriate electrodes (not shown). Of course, any form of electro-mechanical transducer may be employed. When the transducer 24 is energized by an appropriate electrical signal it emits wave energy. The intensity of the radiated energy is a function of the angular position of a receiving point relative to an axis 25 for the transducer. In other words, the transducer exhibits a beam pattern represented schematically and approximately by a broken outline 26 which extends from the transducer 24 away from the member 20 along axis 25 toward the entrant surface 27 of the test object 13.

Member 20 is of cylindrical configuration and is of smaller diameter than and concentric with a cylinder 30 in which it is positioned. At its upper end it has a piston 31 having outside diameter which is essentially the same as the inside diameter of cylinder 30. Member 20 has an axial bore 32 which receives a compression spring 33. The lower end of the spring bears against a shoulder 34, while the upper end bears against a cap 35 which closes and seals the upper end of cylinder 30. The lower end of cylinder 30 is provided with an inwardly-directed flange 36 which conforms to and is sealed to the outer cylindrical wall of member 20 although permitting relative axial motion. Spring 32 urges the member 20 downwardly relative to the cylinder 30. However, when hydraulic pressure is introduced to the annulus between member 20 and cylinder 30, piston 31 is urged upwardly and, of course, the member 20 is carried with it.

To supply hydraulic pressure to the piston-cylinder arrangement 30, 31, the annulus between member 20 and cylinder 30 is connected by a conduit 37 to one end of a flexible hose 38. The other end of the hose 38 is connected to a conduit 39 that extends longitudinally through a portion of shaft 11. The righthand end (FIG. 2) of the conduit 39 is connected by a coupling 40 to a hydraulic actuator comprised of a cylinder 41 bored in a housing 42 that is attached to the outer end of shaft 11. The cylinder 41 receives a piston 43 from which a connecting rod 44 (FIG. 3) extends. The free end of the connecting rod 44 is coupled by a pin and slot connection 45 to a pivoted lever 46 that is mechanically connected to the pivoted end of a control lever 47. The free end of lever 47 carries an operating handle 48 for displacing the lever upwardly and downwardly as indicated by arrows 49. A pointer 50 at the pivoted end of lever 47 travels along indicia 51 which may be calibrated in inches to represent movement of the search unit 23 in the direction of axis 25 (FIG. 2).

In order to effect scanning movement of the search unit 23 (and its transducer 24) there is provided, in accordance with the present invention, means in the form of a first mechanical coupling for connecting the member 20 to the support 10, 11. As shown in FIG. 2, this mechanical coupling is comprised of a pair of arcuate members 55 and 56 which are disposed on opposite sides of search unit 23. Cut into opposing wall portions of the members 55 and 56 are respective arcuate grooves 57 and 58 which lie on or define circles having a center substantially coincident with the intersection 59 of beam axis 25 and the entrant surface 27 of test object 13. The grooves or guides 57 and 58 have cooperating followers 60 and 61 (FIG. 4) which extend outwardly from a pair of members 62 and 63 that are disposed on opposite sides of search unit 21. The upper extremities of members 62 and 63 are secured, as by welding, to the lower end of cylinder 30. Thus, movement of the followers 60, 61 determines movement of the cylinder 30 and the member 20, and such movement is constrained to a circle whose center is substantially coincident with point 59.

To produce movement of the search unit 23 along an arcuate path of the type just described, while permitting movement along another arcuate path to be described hereinafter, cylinder 31 has an exterior extension 64 (FIG. 2). The extension is in the form of a yoke or fork which receives a horizontal rod 65 extending between the free ends of another fork 66, best seen in FIG. 1. With reference again to FIG. 2, the closed end of the fork 66 is connected to one end of a rod 67 that passes through an axial opening 68 in shaft 11. A cable 69 extends through central bore 70 in rod 67, through an opening 71 in the left-hand of the rod and into a flexible tube 72 that is connected to and sealed to the periphery of a central opening in closure 35. From the tube 72 the cable 69 extends through a central bore 73 in member 20 and thus electrical connections are completed by the insulated conductors of the cable to the transducer 24.

To effect movement of rod 67 along axis 12, the former is slidably supported within opening 68 and a rack 74 on its outer surface is in meshing engagement with a pinion 75. The pinion 75 is disposed within a housing 76 and is fixed to a shaft 77 whose outer end carries a control knob 78 as shown in FIG. 3. A pointer 79 is fixed to housing 76 and as shown in FIG. 6 is arranged to cooperate with indicia 80 inscribed on a portion of the knob 78 of reduced diameter. The indicia 80 may be calibrated in degrees representing arcuate-displacement of the member 20 (and of the transducer 24). To lock the shaft 77 against movement a screw 81 (FIG. 3) is threaded into an opening 82 in housing 76 and its free end is arranged to be received within an annular recess 83 in a portion of the control member 78. The upper end of the screw is fixed to a knob 84.

In order to provide movement of member 20 (and transducer 24) along another arcuate path, the guide members 55 and 56 are secured to a follower 85 which cooperates with a track or guide member 86 which, as shown in FIG. 5, is of arcuate configuration. More specifically, member 86 has an upper surface 87 that lies on a circle whose center is substantially coincident with the intersection 59 between axis 25 and the entrant surface 27 of the test object 13. As shown in FIG. 2, the follower 85 includes surfaces 88 which engage corresponding sides of the guide 86 to inhibit movement transverse to the arcuate movement just described. Similarly, an upper extension 89 of the follower 85 is received between opposed surfaces of a flange 90 that is integral with shaft 10 and of another member 91 that is spaced from the flange 90 a distance equal to the thickness of extension 89.

To join the shafts 10, 11 in a rigid assembly, four posts 92 extend between flange 90 and another flange 93 that is integral with shaft 11. As seen in FIG. 5, the posts are equally spaced relative to horizontal axis 12 and they maintain the shafts 10 and 11 fixed relative to one another.

Referring again to follower 85 in FIG. 5, it is provided with a cutout portion 94 into which an arcuate rack 95 is cut. The rack lies along a circle whose center is substantially coincident with point 59. A pinion 96 is in meshing engagement with the rack and as shown in FIG. 2, the pinion is integral with a shaft 97 that extends through an axial opening 98 in shaft 10. The outer end of shaft 97 is fixed to a control knob 98, and the shaft may be locked against movement by means of a screw 99 that is threaded into an opening in the wall of shaft 10. It is positioned so that the free end of the screw engages an annular recess 101 of the shaft. The remaining end of the screw is provided with a head 102. As best seen in FIG. 1 the control knob 98 carries indicia 103 which cooperate with an inscribed pointer 104 on the outer surface of shaft 11. The indicia 103 may be calibrated in degrees to represent arcuate movement of the portion of the mechanism just described.

The organization of elements thus far described may be utilized for ultrasonic inspection by utilizing a suitable couplant to provide a conducting path for ultrasonic wave energy between transducer 24 and surface 27 of the test object 13. For example, the test object may be immersed in a tank of water and the search unit 23 immersed sufficiently so that the required path is afforded.

In certain applications, immersion of the test object may not be practicable. In such cases, an arrangement such as disclosed and claimed in Patent No. 2,545,101 may be employed in an organization of elements embodying the present invention. To this end, as shown in FIG. 1, a cylindrical container 110 receives the member which carries the search unit 23, the coupling mechanisms which provide the movements described above, and portions of the support 10, 11.

More specifically, the container 110 (see FIG. 2) includes a disc-shaped bearing member 111 having a central opening 112 which receives the shaft 10. The member 111 is disposed between clamp 15 and flange 90 and bearings 113 of conventional form facilitate rotational movement between the shaft and the member 111. Opening 112 has a portion 114 of reduced diameter which cooperates with a fluid seal of conventional construction so that although the parts are freely rotatable, a substantially fluid-tight connection is provided. Similarly, another disc-shaped bearing member 115 is disposed between clamp 16 and flange 93. It has a central opening 116, and is likewise provided with ball bearings 117 and a sealing section 118. The members 111 and 115 have individual skirts 119 and 120 which extend toward one another and parallel to axis 12 and terminate in respective annular flanges 121 and 122.

Wheel 110 is provided with a peripheral portion 123 constructed of a material which is substantially transparent to ultrasonic energy, for example, it may be constructed of relatively thin rubber as disclosed in Patent No. 2,545,101. It is of the general configuration of a tire having a substantially flat central portion and its inwardly directed portions 124 and 125 bear against the outer surfaces of flanges 121 and 122, respectively. Individual clamping collars 126 and 127 are provided and each of the collars is driven into clamping engagement with portions 124 and 125 of the transparent member 123 by means of clamping rings 128 and 129 which are threaded onto exterior surface portions of the cylindrical skirts 119 and 120. Accordingly, a fluid-tight enclosure is provided by container 110.

The container 123 is filled with a couplant liquid such as mineral oil, through a valve 130 in member 111. Member 111 is also provided with a plug 131 which may be removed to facilitate filling.

In the operation of the search unit assembly just described, the outer surface of container 123 and test object 13 are placed in engagement with one another and ultrasonic wave energy from the transducer 24 (when appropriately energized) passes into the test object. Reflections resulting from the presence of defects or flaws within the test object cause some of the ultrasonic energy to be returned to the transducer. If for any reason, it is desired to change the spacing between the transducer and the entrant surface 27 of the test object, control 48 (FIG. 3) is manipulated and piston 43 is displaced through cylinder 41 in a direction which, for example, reduces the hydraulic pressure. This change is conveyed via fitting 40, conduit 39, flexible hose 38 and conduit 37 to the annulus between member 20 and cylinder 30. Accordingly, spring 33 displaces the member 20 to a new position, for example, at which search unit 23 is disposed at a position illustrated in broken outline 23a. Of course, movement in the reverse direction can be accomplished by movement of the control 48 in the reverse direction. It is significant that the movement of member 20 and of search unit 23 occurs along axis 25 and thus any movement of the search unit in either of its arcuate directions (to be described hereinafter) carries the transducer along a circle whose center remains at point 59.

If scanning of the test object is desired in the plane of FIG. 2, knob 78 (FIG. 3) is rotated and the resulting rotation of pinion 75 drives rack 74, for example, in from left to right as viewed in FIG. 2 and the search unit is moved to a new position. For example, it may be carried to the position illustrated in broken outline 23b. It is significant to note that axis 25 which in a new position represented by the numeral 25a remains substantially coincident with point 59.

If movement of the search unit is desired in the plane of FIG. 5, knob 98 is rotated and pinion 96 drives rack 95 to a new position. For example, the arcuate members 55 and 56 may be displaced to the positions illustrated in broken outlines 55' and 56' carrying the axis 25 to the position designated 25b. Here again, the intersection of the axis with the entrant surface of the test object remains substantially coincident at point 59. Likewise, movement in the opposite direction may bring the axis to position 25c and again the intersection remains at point 59.

In general, arcuate movement of the member 20 (and of the search unit 23) occurs along circular paths whose planes are substantially at right angles to one another. Moreover, the circles have their centers substantially coincident at point 59.

With the foregoing arrangement, scanning of the test object may be accomplished efficiently and reliably. Further, it is obvious that a search unit assembly embodying the present invention provides a great degree of flexibility since the search unit may be moved in a variety of directions. Generally stated, the search unit has three degrees of freedom while the beam axis 25 will always, to a substantial degree, intersect point 59.

If desired, the apparatus may be constructed so that point 59 is just above or just below entrant surface 27, depending upon the particular application. In any event, the beam axis 25 will intersect the point 59 for any scanning adjustment.

While particular embodiments of the present invention have been shown and described, it is obvious that changes and modifications may be made without departing from this invention in its broader aspects and, therefore, the aim in the appended claims is to cover all such changes and modifications as fall within the true spirit and scope of this invention.

As used in the following claims, the term "track element" and "follower element" are to be construed as descriptive of the relative motion between the two elements rather than between one of the elements and an external reference. A "track" may include, for example, a slot, a cylinder, or a rack, and may be either fixed or movable relative to an external reference.

I claim:

1. In ultrasonic inspection apparatus, a search unit assembly including
    an electro-mechanical transducer having an active surface with a beam pattern extending therefrom along an axis,
    a first guide mechanism including a first arcuate track element and a first cooperating follower element,
    one of said first elements being mechanically connected to said transducer and supporting said transducer, said transducer being positioned with its transmitting surface free of engagement with solid matter and its beam pattern extending away from said first elements and along an axis, said first elements constraining movement of said transducer along a path defining a circle having a center intersected by said axis,
    a second guide mechnaism including a second arcuate track element and a second cooperating follower element,
    one of said second elements being mechanically connected to one of said first elements, said second elements constraining movement of said transducer along a path defining another circle lying in a plane other than the plane of said first-mentioned circle and having a center substantially coincident with said first-mentioned center, and
    means for effecting relative movement between said first track and follower elements and between said second track and follower elements.

2. In ultrasonic inspection apparatus, a search unit assembly including
    an electro-mechanical transducer having an active surface with a beam pattern extending therefrom along an axis,
    a first guide mechanism including a first arcuate track element and a first cooperating follower element,
    one of said elements being mechanically connected to said transducer and supporting said transducer with its beam pattern extending away from said elements along an axis,
    said first elements constraining movement of said transducer along a path defining a circle having a center intersected by said axis,
    a second guide mechanism including a second arcuate track element and a second cooperating follower element,
    one of said second elements being mechanically connected to one of said first elements,
    said second elements constraining movement of said transducer to a path defining another circle lying in a plane other than the plane of said first-mentioned circle and having a center substantially coincident with said first-mentioned center,
    means for effecting relative movement between said first elements and between said second elements,
    a cylindrical container enclosing said transducer and said guide mechanisms, said container including a peripheral portion constructed of a material substantial by transparent to ultrasonic wave energy, means connecting said container to said guide mechanisms for rotation with respect thereto, and a coupling fluid disposed within said container for conducting ultrasonic wave energy between said peripheral portion of said container and said transducer.

3. In ultrasonic inspection apparatus, a search unit assembly for suspending an electro-mechanical transducer in predetermined relation to an entrant surface of a test object with its transmitting surface free of engagement with solid matter, said search unit including an electro-mechanical transducer having an active surface with a beam pattern extending along an axis, a first guide mechanism including a first arcuate track element defining a circular path and a cooperating follower element, one of said first elements being mechanically connected to said transducer and supporting said transducer with the axis of the beam pattern extending away from said first elements toward the entrant surface of the test object, said first elements constraining movement of said transducer to a path defining a circle having a center substantially coincident with the intersection of said axis and the entrant surface of the test object, a second guide mechanism including a second arcuate track element and a second follower element, one of said second elements being mechanically connected to one of said first elements, said second elements constraining movement of said transducer to a path defining another circle lying in a plane other than the plane of said first-mentioned circle and having a center substantially coincident with said first-mentioned center, and means for effecting relative movement between said first elements and between said second elements.

4. In ultrasonic inspection apparatus, a search unit assembly for supporting an electro-mechanical transducer in predetermined relation to an entrant surface of a test object, said search unit assembly including an electro-mechanical transducer having an active surface with a beam pattern extending along an axis, a first guide mechanism including a first arcuate track element and a cooperating first follower element, one of said elements being mechanically connected to said transducer and supporting said transducer with the axis of the beam pattern extending away from said first elements toward the entrant surface of the test object, said first elements constraining movement of said transducer to a path defining a circle having a center intersected by said axis, a second guide mechanism including a second arcuate track element and a cooperating second follower element, one of said second elements being mechanically connected to the other of said first elements, said second elements constraining movement of said transducer to a path defining another circle lying in a plane other than the plane of said first-mentioned circle and having a center substantially coincident with said first-mentioned center, means for effecting relative movement between said first elements and between said second elements, a cylindrical container enclosing said transducer and said guide mechanisms and including a peripheral portion substantially transparent to ultrasonic wave energy, means for connecting said container to said guide mechanisms for rotation relative thereto about an axis of rotation, and control means extending into said container coaxially relative to said axis of rotation and mechanically coupled to said means for effecting relative movement.

5. An assembly according to claim 4 wherein said control means includes a pair of control members extending into respective sides of said container, and wherein said means for effecting relative movement responds to rotation of one of said control members and to axial displacement of the other of said control members.

6. In ultrasonic inspection apparatus, a search unit assembly including an electro-mechanical transducer having an active surface with a beam pattern extending along an axis, a first guide mechanism including a first track element and a first cooperating follower element, one of said elements being mechanically connected to said transducer and supporting said transducer for movement, said elements having a configuration for constraining movement of said transducer along a substantially straight line substantially coincident with said axis and toward the entrant surface of the test object, a second guide mechanism including a second arcuate track element and a second cooperating guide element, one of said second elements being mechanically connected to one of said first elements, said second elements constraining movement of said transducer along a path defining a first circle having a center intersected by said line, a third guide mechanism including a third arcuate track element and a third cooperating guide element, one of said third elements being mechanically connected to one of said second elements, said third elements constraining movement of said transducer along a path defining a second circle lying in a different plane than said first circle but having a center substantially coincident with the center of said first circle, and means for effecting relative movement between said first elements, between said second elements and between said third elements.

7. In ultrasonic wheel search unit inspection apparatus including a liquid-filled wheel and an ultrasonically transparent test-object-contacting diaphragm, a search unit assembly including a support member, an electro-mechanical transducer having an active surface with a beam pattern extending therefrom along an axis, a first guide mechanism including a first track element and a first cooperating follower element, one of said first elements being mechanically connected to said transducer and supporting said transducer for movement, said first elements having a configuration for constraining movement of said transducer to a substantially straight line substantially coincident with the axis and extending toward the entrant surface of the test object, a second guide mechanism including a second arcuate track element and a second cooperating follower element, one of said second elements being mechanically connected to one of said first elements, said second elements constraining movement of said transducer to a path defining a circle having a center intersected by said line, a third guide mechanism including a third arcuate track element and a third cooperating follower element, one of said third elements being mechanically connected to one of said second elements, and the other of said third elements being mounted on said support member to position said transducer with its active surface free of engagement with solid material, said third elements constraining movement of said transducer to a path defining another circle lying in a plane other than the plane of said first-mentioned circle but substantially concentric therewith, and means for effecting relative movement between said first elements, between said second elements and between said third elements, said search unit assembly being positioned totally within said wheel search unit.

8. An assembly according to claim 7 wherein
said first guide mechanism is in the form of a piston and cylinder arrangement and wherein
said assembly further comprises a hydraulic actuator coupled to said piston and cylinder arrangement for selectively displacing said first track element and said first follower element relative to one another along said line.

9. An apparatus for ultrasonically inspecting a workpiece, said apparatus including the combination of
a wheel having a periphery for rolling along an entrant surface of the workpiece,
an ultrasonic transducer disposed inside said wheel and having an active surface free of engagement with solid matter for transmitting and receiving ultrasonic energy along a beam pattern having a predetermined primary axis,
first guide means disposed in said wheel and carried thereby, said first guide means being mechanically connected to said transducer and supporting said transducer,
second guide means disposed inside of said wheel and carried by the first guide means,
said second guide means supporting the transducer, said first and second guide means being effective to position the transducer inside of the wheel with the axis of the beam pattern extending through the periphery of the wheel and toward the workpiece to intersect the portion of the wheel engaging the entrant surface,
said first guide means including means to move said transducer along a predetermined path to vary the angle of incidence of the primary axis upon said entrant surface whereby the primary axis will always substantially intersect said portion, said second guide means including means to move said transducer along a second predetermined path that is angularly disposed to the first path to vary the angle of incidence of the primary axis upon said entrant surface whereby the primary axis will always substantially intersect said portion.

10. An apparatus for ultrasonically inspecting a workpiece, said apparatus including the combination of a search wheel for scanning across the surface of the workpiece, a tire on said wheel having a tread that rolls on said surface and forms a "flat" in said tread at the area of contact with the surface, guide means mounted on said wheel and carried inside of said tire as said wheel scans across said workpiece, an ultrasonic transducer mounted upon said guide means and carried thereby, said transducer having an active surface for transmitting and receiving ultrasonic energy along a beam pattern having a predetermined primary axis that intersects said "flat," said guide means being constructed and arranged to move said transducer through a range of positions wherein the angle of incidence of said beam on said "flat" varies in a first plane parallel to the direction of scanning and a second direction normal to the first plane, and means coupled to said guide means to move said transducer on said guide means.

11. An apparatus for ultrasonically inspecting a workpiece, said apparatus including the combination of a search wheel for scanning across the surface of the workpiece, a tire on said wheel having a tread that rolls on said surface and forms a "flat" in said tread at the area of contact with said surface, guide means mounted on said wheel and carried inside of said tire as said wheel rolls across said workpiece, an ultrasonic transducer having an active surface for transmitting and receiving ultrasonic energy along a beam pattern having a predetermined primary axis, said transducer being movably mounted upon said guide means with said primary axis incident upon said "flat," said guide means being effective to move said transducer through a range of positions that are located on a sphere that is concentric with the point of incidence whereby said beam will always intersect said "flat," and means coupled to said guide means to move said transducer on said guide means.

12. An apparatus for ultrasonically inspecting a workpiece, said apparatus including the combination of a wheel having a tire for rolling across the surface of said workpiece, an ultrasonic transducer disposed in said wheel and having an active surface for transmitting and receiving ultrasonic energy along a beam pattern having a predetermined primary axis, first guide means disposed in said wheel and mechanically connected to said transducer and supporting said transducer, second guide means mechanically connected to the first guide means and supporting the transducer, said guide means positioning the transducer with the axis of the beam pattern extending toward the workpiece and intersecting the portion of the tire engaging the surface of the workpiece, said first guide means including means to move said transducer along a predetermined path, said second guide means including means to move said transducer along a second predetermined path that is angularly disposed to the first path, said guide means being effective to maintain the transducer and the active surface thereon always oriented to retain the primary axis substantially coincident with the portion of the tire engaging the surface of the workpiece.

References Cited by the Examiner

UNITED STATES PATENTS

| | | | |
|---|---|---|---|
| 2,545,101 | 3/1951 | Meunier | 73—71.5 X |
| 2,940,305 | 6/1960 | Williams et al. | 73—67.8 |
| 2,989,864 | 6/1961 | Bamford | 73—67.8 |
| 3,028,751 | 4/1962 | Joy | 73—67.8 |
| 3,056,285 | 10/1962 | Gibson | 73—67.8 |

FOREIGN PATENTS

| | | |
|---|---|---|
| 1,065,907 | 1/1954 | France. |
| 766,984 | 1/1957 | Great Britain. |

RICHARD C. QUEISSER, *Primary Examiner.*

JOHN P. BEAUCHAMP, *Examiner.*